United States Patent Office 2,975,162
Patented Mar. 14, 1961

2,975,162
PROCESS FOR THE PRODUCTION OF POLYMERIZATION PRODUCTS OF VINYL CHLORIDE

Arnd Hoff, Schkopau, uber Merseburg, Germany, assignor to VEB Chemische Werke Buna, Schkopau, Germany No Drawing. Filed June 20, 1957, Ser. No. 667,035

Claims priority, application Germany Aug. 21, 1956

8 Claims. (Cl. 260—85.7)

This invention relates to polymerization processes and more particularly to suspension polymerization processes for the production of polymerization products of vinyl chloride.

The term "polymerization products of vinyl chloride" as used in this specification and the appended claims is deemed to include polymerization products of vinyl chloride alone and mixed polymerization products (copolymers) of vinyl chloride and another compound or compounds capable of polymerization.

The production of polymerization products of vinyl chloride by suspension or bead polymerization is known. The monomers to be polymerized are usually dispersed in water or another dispersion medium under vigorous stirring and in definite weight proportions. The weight ratio between monomers and dispersion medium is commonly kept at 1:2 or 1:3. The polymerization takes place at elevated temperature in the individual liquid droplets of the monomers distributed throughout the dispersion medium. The polymerization product is obtained after completed polymerization in the form of beads of various sizes, which are filtered from the dispersion medium, washed and dried.

The suspension polymerization is usually performed in the presence of suspension stabilizers which are adapted to prevent the individual monomer droplets from sticking to each other. Suspension stabilizers of both organic and inorganic nature have been proposed.

Further, the polymerization is usually carried out in the presence of catalysts. A variety of organic and inorganic substances is commonly in use as such catalysts.

Known processes for the production of polymerization products of vinyl chloride by suspension polymerization have several disadvantages which are summarized as follows:

(1) The weight ratio between monomers and dispersion medium, i.e. usually water, should be at least 1:2 or still better 1:>2, so as to obtain an adequate distribution of the monomers throughout the dispersion medium. Since relatively large quantities of water are thus required, the yield with regard to space and time is rather poor.

(2) When the weight ratio between monomers and water is kept at 1:<2, it frequently happens that the reaction mass after completed polymerization turns into a powder which feels entirely dry. This means that the aqueous phase has been absorbed by the polymerization product formed. The attainment of such water-containing powder is usually entirely undesired since the removal of such powder from the autoclave or the like reaction vessel and the conveying of the powder is connected with considerable difficulties. Large scale production is thus impaired.

(3) In spite of the presence of stabilizers, a high percentage of the polymerization product is frequently obtained in the form of sticky lumps of varying size. Since bead formation is desired, the formation of lumps reduces the yield and is undesired.

(4) The beads obtained frequently do not meet expectations with regard to size and uniformity, i.e. they are either too large or altogether not uniform in size. The larger the bead diameter, the more difficult is the further working up.

(5) Relatively large quantities of catalysts are usually required (0.1 to 0.5% calculated on the monomers) which usually require a cumbersome separation of the decomposition products of the catalysts or of unspent catalyst proper from the polymerization product. If the decomposition products of the catalysts or the unspent catalyst residues are not removed from the polymerization products to a sufficient extent, the polymerization products obtained exhibit poor thermic stability upon subsequent working-up. The term "thermic stability" as used in this context is deemed to connote the conduct or behavior of the polymerization products during rolling on hot rollers. The greater the thermic stability of the polymerization products, the longer can they be treated and worked on hot rollers before becoming discolored and starting to stick to the roller surfaces.

(6) Some of the known catalysts are active at temperatures only which are higher than the required polymerization temperatures, resulting in a slow polymerization speed.

(7) The employment of water-soluble catalyst is undesirable, since the activation should take place in the monomeric droplets and not in the aqueous phase. The employment of water-soluble catalysts frequently causes the formation of a disturbing emulsion negatively affecting the polymerization.

(8) The separation of water-insoluble suspension stabilizers of inorganic nature from the polymerization products is connected with difficulties.

It is an object of this invention to provide a simple suspension polymerization process for the production of polymerization products of vinyl chloride which overcomes the disadvantages of the known processes referred to.

A further object of this invention is generally to improve on suspension polymerization processes for the production of polymerization products of vinyl chloride as customarily practiced.

In accordance with this invention, a suspension polymerization process for the production of polymerization products of vinyl chloride is carried out in water in the presence of (a) the sodium salt of mixed polymerization products of styrene with maleic acid anhydride and (b) anhydrides of organic sulfoperacids with organic acids, in particular acetyl cyclohexane sulfonyl peroxide, or mixtures of mixed anhydrides of organic sulfo-peracids with organic acids, in particular acetyl cyclohexane sulfonyl peroxide with azodiisobutyric acid nitrile. The compound (a) serves as suspension stabilizer while compound (b) is a polymerization catalyst. The molecular ratio between styrene and maleic acid anhydride in the stabilizer should advantageously be 1:1.

The suspension stabilizers, i.e. compound (a) may be readily removed from the polymerization product after completed polymerization, e.g. by washing the polymerization product.

Acetyl cyclohexane sulfonyl peroxide is particularly preferred as catalyst. The production of this compound is described in, for example, the "Annalen der Chemie," volume 578, page 50 ff. (1952). This compound decomposes at temperatures of from 30–70° C. and forms two radicals. This low decomposition temperature results in high polymerization speeds at polymerization temperatures of about 40–45° C. Further, relatively small quantities of catalyst are sufficient. Thus, 0.05% of the peroxide referred to, calculated on the monomer or monomer mixtures present in the suspension to be polymerized, are sufficient to assure a successful and smooth polymerization and to effect the polymerization at sufficient speed.

If catalyst mixtures of acetyl cyclohexane sulfonyl peroxide and azodiisobutyric acid nitrile are employed, polymerization temperatures of 45–50° C. may be maintained. If the polymerization is carried out with such mixtures, the acetyl cyclohexane sulfonyl peroxide acts at the beginning of the polymerization at relatively low temperatures, while the butyric acid nitrile becomes active as catalyst at a temperature of about 50° C. In other words, the polymerization is initiated by the catalytic effect of the sulfonyl peroxide and completed by the catalytic effect of the butyric acid nitrile. It is pointed out that only very small quantities of the catalyst mixture are required. Thus, it has been ascertained that 0.03% of acetyl cyclohexane sulfonyl peroxide and 0.05% of azodiisobutyric acid nitrile, both calculated on the monomers present, are sufficient. This means that a total amount of 0.08% of catalyst exhibits a sufficient catalytic action. The polymerization speeds obtained in this manner render it possible to effect a satisfactory and smooth polymerization.

The peroxide and the butyric acid nitrile are soluble in the monomers but not in the aqueous phase, so that the polymerization takes place in the suspended droplets of the monomers only and not in the aqueous phase. An undesired formation of an emulsion—so frequently occurring when known catalysts are used—is then avoided.

It should be mentioned that a very important advantage resides in the fact that—due to the very small amounts of catalyst or catalyst mixture to be used—the polymerization products obtained exhibit an excellent thermic stability as previously defined. This thermic stability is by far superior to that of polymerization products prepared by conventional polymerization processes with conventional catalysts.

The process may advantageously be carried out at a ratio between monomers and the aqueous phase of 1:1 or even 1:<1 without danger of the powder or lump formation referred to. Since relatively small quantities of water are thus sufficient, the yield with regard to space and time is considerably increased. The reaction mass, after completed polymerization is present in the form of a well flowing suspension which may be conveyed through pipe lines or the like over long distances without difficulties. The formation of sticky lumps adhering to the walls and the stirrer of the autoclave or the like reaction vessel is entirely avoided. Further, small beads having a diameter of not more than about 0.2 millimeter are obtained. Moreover, the diameter of the beads obtained is fairly uniform, usually varying between 0.02 and 0.2 millimeter dependent on process conditions, raw material, etc.

The stabilizer should be present in an amount of about from 0.1 to 1.0 percent calculated on the aqueous phase. It is particularly advantageous if the stabilizer is present in quantities of about 0.5%.

The invention will now be described by several examples. However, it should be understood that these examples are given for the purpose of illustration rather than for the purpose of limitation, and many changes in for example quantities, temperatures, choice of starting materials and process conditions in general may be effected without departing in any way from the spirit and scope of this invention.

*Example 1*

The polymerization hereinafter to be described was carried out in an enamelled autoclave fitted with stirrer of V2A (chromium-nickel steel containing about 18% of chromium and about 8% of nickel) and having a capacity of about 40 liters. 15,000 grams of water were introduced into the autoclave. 75 grams of the sodium salt of a mixed polymerization product of styrene and maleic acid anhydried in a mole relation of 1:1 were dissolved in the water. 7.5 grams of acetyl cyclohexane sulfonyl peroxide were thereafter added to the aqueous solution. The air in the autoclave was then driven out with nitrogen. Upon closing the autoclave, 15,000 grams of vinyl chloride were then pressed into the autoclave by means of nitrogen. The stirrer was then switched on so as to rotate with a speed of about 300 r.p.m. and the contents of the autoclave were heated to 40–45° C. The polymerization of the vinyl chloride was finished after about 25 hours. The reaction mass was then removed from the autoclave. This may be effected by, for example, forcing the mass out through a riser. The reaction mass was then treated in hot state with a caustic soda solution, whereafter it was filtered, washed and dried. The K-value of the polymerization product obtained was about 80.

*Example 2*

The polymerization hereinafter to be described was carried out in an enamelled autoclave fitted with stirrer of V2A and having a capacity of about 40 liters. 15,000 grams of water were introduced into the autoclave. 75 grams of the sodium salt of a mixed polymerization product of styrene and maleic acid anhydride in a mole relation of 1:1 were dissolved in the water. 7.5 grams of acetyl cyclohexane sulfonyl peroxide were thereafter added to the aqueous solution. The air in the autoclave was then driven out with nitrogen. Upon closing the autoclave, first 450 grams of vinyl acetate and thereafter 14,550 grams of vinyl chloride were pressed into the autoclave by means of nitrogen. The stirrer was then switched on so as to rotate with a speed of about 300 r.p.m. and the polymerization was finished after about 25 hours (40–45° C.). The reaction mass was then removed from the autoclave. This may be effected by, for example, forcing the mass out through a riser. The reaction mass was then filtered, washed and dried. The K-value of the polymerization product obtained was about 80.

*Example 3*

The polymerization hereinafter to be described was carried out in an enamelled autoclave fitted with stirrer of V2A and having a capacity of about 40 liters. 15,000 grams of water were introduced into the autoclave. 75 grams of the sodium salt of a mixed polymerization product of styrene and maleic acid anhydride in a mole relation of 1:1 were dissolved in the water, 7.5 grams of acetyl cyclohexane sulfonyl peroxide were thereafter added to the aqueous solution. The air in the autoclave was then driven out with nitrogen. Upon closing the autoclave, first 1200 grams of vinyl acetate and thereafter 13,800 grams of vinyl chloride were pressed into the autoclave by means of nitrogen. The stirrer was then switched on so as to rotate with a speed of about 300 r.p.m. and the polymerization was finished after about 25 hours (40–45° C.). The reaction mass was then removed from the autoclave. This may be effected by, for example, forcing the mass out through a riser. The reaction mass was then filtered, washed and dried. The K-value of the polymerization product obtained was about 80.

*Example 4*

The polymerization hereinafter to be described was carried out in an enamelled autoclave fitted with stirrer of V2A and having a capacity of about 40 liters. 15,000 grams of water were introduced into the autoclave. 75 grams of the sodium salt of a mixed polymerization product of styrene and maleic acid anhydride in a mole relation of 1:1 were dissolved in the water. 7.5 grams of acetyl cyclohexane sulfonyl peroxide were thereafter added to the aqueous solution. The air in the autoclave was then driven out with nitrogen. Upon closing the autoclave first 2250 grams of vinyl acetate and thereafter 12,750 grams of vinyl chloride were pressed into the autoclave by means of nitrogen. The stirrer was then switched on so as to rotate with a speed of about 300 r.p.m. and the polymerization was finished after approximately 25 hours (40–45° C.). The reaction mass was then removed from the autoclave. This may be effected by, for example, forcing the mass through a riser. The reaction mass was then filtered, washed and dried. The K-value of the polymerization product obtained was about 75.

*Example 5*

The polymerization hereinafter to be described was carried out in an enamelled autoclave fitted with stirrer of V2A and having a capacity of about 40 liters. 15,000 grams of water were introduced into the autoclave. 75 grams of the sodium salt of a mixed polymerization product of styrene and maleic acid anhydride in a mole relation of 1:1 were dissolved in the water. 7.5 grams of acetyl cyclohexane sulfonyl peroxide were thereafter added to the aqueous solution. The air in the autoclave was then driven out with nitrogen. Upon closing the autoclave, first 6000 grams of vinyl acetate and thereafter 9000 grams of vinyl chloride were pressed into the autoclave by means of nitrogen. The stirrer was then switched on so as to rotate with a speed of about 300 r.p.m. and the polymerization was finished after about 25 hours (40–45° C.). The reaction mass was then removed from the autoclave. This may be effected by, for example, forcing the mass out through a riser. The reaction mass was then filtered, washed and dried. The K-value of the polymerization product obtained was between 65–70.

*Example 6*

The polymerization hereinafter to be described was carried out in an enamelled autoclave fitted with stirrer of V2A (chromium-nickel steel containing about 18% of chromium and about 8% of nickel) and having a capacity of about 40 liters. 1500 grams of water were introduced into the autoclave. 75 grams of the sodium salt of a mixed polymerization product of styrene and maleic acid anhydride in a mole relation of 1:1 were dissolved in the water. 4.5 grams of acetyl cyclohexane sulfonyl peroxide and 7.5 grams of azodiisobutyric acid nitrile were thereafter added to the aqueous solution. The air in the autoclave was then driven out with nitrogen. Upon closing the autoclave, 15,000 grams of vinyl chloride were then pressed into the autoclave by means of nitrogen. The stirrer was then switched on so as to rotate with a speed of about 300 r.p.m. and the contents of the autoclave were heated to about 40–50° C. The polymerization was terminated after about 14 hours. The reaction mass was then removed from the autoclave. This may be effected by, for example, forcing the mass out through a riser. The reaction mass was then treated in hot state with a caustic soda solution, whereafter it was filtered, washed and dried. The K-value of the polymerization product obtained was about 70–75.

*Example 7*

The polymerization hereinafter to be described was carried out in an enamelled autoclave fitted with stirrer of V2A (chromium-nickel steel containing about 18% of chromium and about 8% of nickel) and having a capacity of about 40 liters. 15,000 grams of water were introduced into the autoclave. 75 grams of the sodium salt of a mixed polymerization product of styrene and maleic acid anhydride in a mole relation of 1:1 were dissolved in water. 4.5 grams of acetyl cyclohexane sulfonyl peroxide and 7.5 grams of azodiisobutyric acid nitrile were thereafter added to the aqueous solution. The air in the autoclave was then driven out with nitrogen. Upon closing the autoclave, 6000 grams of vinyl acetate and 900 grams of vinyl chloride in this order were then pressed into the autoclave by means of nitrogen. The stirrer on the autoclave was operated with a speed of 300 r.p.m. and the polymerization was completed at 40–50° C. after about 14 hours. The reaction mass was then removed from the autoclave. This may be effected by, for example, forcing the mass out through a riser. The reaction mass was then filtered, washed and dried. The K-value of the polymerization product obtained was between 58 and 62.

What I claim is:

1. The process for the production of polymerization products of vinyl chloride, wherein an aqueous suspension of monomeric vinyl chloride in the weight relationship of about 1:1 is polymerized in the temperature range of about 40–50° C. in the presence of about 0.1%–1% by weight based on the aqueous phase of the suspension, of a suspension stabilizer being the sodium salt of a mixed polymerization product of styrene and maleic acid anhydride and about 0.05 percent of acetyl cyclohexane sulfonyl peroxide calculated on the monomer.

2. The process for the production of polymerization products of vinyl chloride, wherein an aqueous suspension of monomeric vinyl chloride in the weight relationship of about 1:1 is polymerized in the temperature range of about 40–50° C. in the presence of about 0.1%–1% by weight based on the aqueous phase of the suspension, of a suspension stabilizer being the sodium salt of a mixed polymerization product of styrene and maleic acid anhydride and a catalyst mixture consisting of about 0.03% of acetyl cyclohexane sulfonyl peroxide and about 0.05 percent of azodiisobutyric acid nitrile calculated on the monomer.

3. The process for the production of polymerized vinyl chloride, wherein an aqueous suspension consisting essentially of water and monomeric vinyl chloride in a weight relation of about 1:1 is heated in a closed system to about 40–50° C. under stirring in an inert atmosphere and in the presence of about 0.25% by weight of the sodium salt of a mixed polymerization product of styrene and maleic acid anhydride in a mole relation of about 1:1 and in the presence of about 0.025% by weight of acetyl cyclohexane sulfonyl peroxide.

4. The process for the production of polymerized vinyl chloride, wherein an aqueous suspension consisting essentially of water and monomeric vinyl chloride in a weight relation of about 1:1 is heated in a closed system to about 40–50° C. under stirring in an inert atmosphere and in the presence of about 0.25% by weight of the sodium salt of a mixed polymerization product of styrene and maleic acid anhydride in a mole relation of about 1:1 and in the presence of a mixture consisting of about 0.015% by weight of acetyl cyclohexane sulfonyl peroxide and 0.025% by weight of azodiisobutyric acid nitrile.

5. The process for the production of a copolymer of vinyl acetate and vinyl chloride, wherein an aqueous suspension consisting essentially of water, vinyl chloride and vinyl acetate in a weight relation of about 100:97:3 to 100:60:40 is heated in a closed system to about 40–50° C. under stirring in an inert atmosphere and in the presence of about 0.25% by weight of the sodium salt of a mixed polymerization product of styrene and maleic acid anhydride in a mole relation of about 1:1 and in the presence of about 0.025% by weight of acetyl cyclohexane sulfonyl peroxide.

6. The process for the production of a copolymer of vinyl acetate and vinyl chloride, wherein an aqueous suspension consisting essentially of water, vinyl chloride and vinyl acetate in a weight relation of about 100:97:3 to 100:60:40 is heated in a closed system to about 40–50° C. under stirring in an inert atmosphere and in the presence of about 0.25% by weight of the sodium salt of a mixed polymerization product of styrene and maleic acid anhydride in a mole relation of about 1:1 and in the presence of a catalytic mixture consisting of about 0.015% by weight of acetyl cyclohexane sulfonyl peroxide and 0.025% by weight of azodiisobutyric acid nitrile.

7. The process for the production of a polymer selected from the class consisting of homopolymers and copolymers of vinyl chloride wherein an aqueous suspension consisting essentially of water and a vinyl composition selected from the class consisting of monomeric vinyl chloride and mixtures thereof with vinyl acetate copolymerizable therewith in a weight relation of approximately 1:1 is heated in the temperature range of about 40–50° C. in the presence of about .1 to 1% by weight, based on the aqueous phase of said suspension, of the sodium salt of a mixed polymerization product of styrene and maleic acid anhydride as a stabilizer, and in the presence of about .03 to .1% by weight, based on the vinyl chloride monomer, of a catalyst selected from the class consisting of acetyl cyclohexane sulfonyl peroxide and a mixture thereof with azodiisobutyric acid nitrile.

8. A process according to claim 13 wherein said stabilizer is composed of styrene and maleic acid anhydride in the weight ratio of 1:1.

References Cited in the file of this patent

Schildknecht: "Vinyl and Related Polymers," page 333, John Wiley & Sons, Inc., New York (1952).

Annalen der Chemie, vol. 578, pages 50–82 (1952).

Schildknecht: "Vinyl and Related Polymers," pages 11, 78, 103, 333, 394 (1952), John Wiley & Sons, Inc., New York.

UNITED STATES PATENT OFFICE
CERTIFICATION OF CORRECTION

Patent No. 2,975,162　　　　　　　　　　　　　　　March 14, 1961

Arnd Iloff

It is hereby certified that error appears in the above numbered patent requiring correction and that the said Letters Patent should read as corrected below.

Column 8, line 5, for the claim reference numeral "13" read -- 7 --.

Signed and sealed this 5th day of September 1961.

(SEAL)
Attest:

ERNEST W. SWIDER　　　　　　　　　　　　　　DAVID L. LADD
Attesting Officer　　　　　　　　　　　　　　　　Commissioner of Patents